Figure 1:
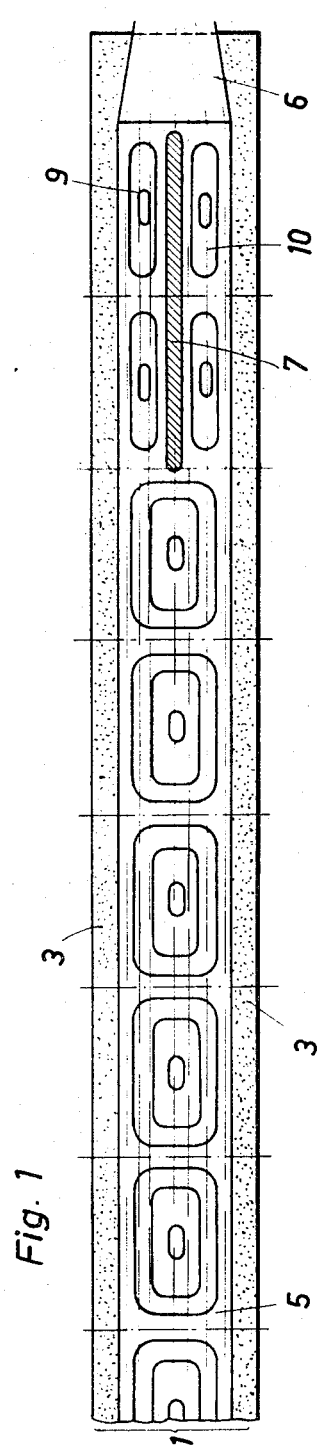

United States Patent [19]
Gerbig et al.

[11] 3,754,634
[45] Aug. 28, 1973

[54] ELECTROMAGNETIC CONVEYOR FOR MOLTEN METAL

[75] Inventors: Hans-Erwin Gerbig, Remscheid; Axel Von Starck, Remscheid-Luttringhausen, both of Germany

[73] Assignee: AEG-Elotherm GmbH, Remscheid-Hasten, Germany

[22] Filed: Oct. 1, 1970

[21] Appl. No.: 77,061

Related U.S. Application Data

[63] Continuation-in-part of Ser. No. 821,341, May 2, 1970, abandoned.

[30] Foreign Application Priority Data
Sept. 14, 1968  Germany.................. P 17 28 231.4
Oct. 3, 1969  Germany.................. P 19 49 982.2

[52] U.S. Cl........................ 198/41, 310/11, 417/50
[51] Int. Cl............................................. B65g 49/00
[58] Field of Search........................ 198/41; 412/50; 310/11

[56] References Cited
UNITED STATES PATENTS
3,362,585  1/1968  Nessim et al. .................. 222/55
3,534,886  10/1970  Von Starck.................... 222/1

*Primary Examiner*—Evon C. Blunk
*Assistant Examiner*—Hadd S. Lane
*Attorney*—Cushman, Darby and Cushman

[57] ABSTRACT

An electromagnetic conveyor for drawing molten metal from a melting or holding vessel of the type having an inclined trough along which the metal moves and an inductor for generating a travelling electromagnetic field which draws the metal up the trough against gravity. Near the higher end of the trough a gate preferably having an adjustable position is mounted in the trough for controlling the depth of molten metal passing the gate. In a first embodiment, the gate comprises an insulating rail and in a second embodiment the gate is a physical barrier. Preferably heaters are mounted on both sides of the gate and the gate can be positioned at any of a plurality of positions along the trough.

15 Claims, 4 Drawing Figures

Patented Aug. 28, 1973

3,754,634

2 Sheets-Sheet 1

ELECTROMAGNETIC CONVEYOR FOR MOLTEN METAL

This is a continuation-in-part of U.S. application Ser. No. 821,341 filed May 2, 1970, now abandoned.

The invention relates to a method and apparatus for drawing molten metal from a melting or holding vessel of the type comprising an inclined trough with the bottom and leading from the melting or holding vessel, and an inductor for generating a travelling electromagnetic field which draws the molten metal against gravity and in an open stream up the trough.

Such electromagnetic conveyors have been used with success and are described, for example in German Patent Specifications Nos. 1,286,701 and 1,291,061. They are particularly useful in automated foundries where it is desired to periodically cast the same volumes of hot metal at invariant intervals of time. The melting or holding furnaces are usually charged at more infrequent and irregular intervals so that the level of the molten metal in the melting or holding vessel varies considerably during operation.

In order to enable constant volumes of metal to be poured despite fluctuations of the metal level in the melting vessel, German Patent Specification 1,286,701 discloses an inductor for generating a travelling electromagnetic field, the length of the inductor being divided by a tap so that the first part of the inductor functions to continuously draw the molten metal up the conveyor trough at a rate independent of the level of the metal bath to a predetermined level where substantially constant metal volumes are further conveyed to the discharging end of the conveyor by the supplementary activation for predetermined periods of time of the second part of the inductor.

In another electromagnetic conveyor as set forth in German Patent Specification 1,291,061, the conveyor contains an immersion electrode at a level of the conveyor above the highest level of the metal bath. When the inductor is energized, the molten metal begins to rise up the trough from the bath until it reaches the electrode, thereby closing an electric circuit for triggering a time delay relay which deactivates the inductor at the end of a given period of time.

In both of these approaches the travelling field produced by the inductor induces currents in the molten metal. The interaction between the components of these currents extending parallel to the channel bottom across the channel axis and the travelling field results in a propulsive force being applied to the metal which propels it against gravity up the trough. However, these approaches assume that, at least in the upper part of the conveyor, the depth of the stream of metal drawn up the conveyor by a given intensity of the travelling field is independent of the level of metal in the bath and of conditions of the metal so that like intensities will convey equal volumes of metal in equal times.

Experience has shown, however, that this assumption is more nearly true the greater the distance between that point in the conveyor which is reached by the metal surface when it is at its highest level in the furnace vessel and the highest elevation of the conveyor. The reason for this is that, although the depth of the stream of molten metal drawn from the bath by the travelling field depends upon the field intensity, the viscosity of the molten metal causes additional volumes of metal to be entrained from the bath which form a metal layer from bath to conveyor that diminishes in thickness towards the upper end of the conveyor and finally asymptotically approaches a constant value.

In order to achieve volumetrically accurate pours, relatively elongated conveyors were therefore hitherto used, so that in practice a constant layer thickness had already developed at the highest elevation of the conveyor irrespective of the level of the bath. However conveyors of great length are not very desirable for reasons of cost as well as of space.

Also, a necessary condition for a constant rate of flow of the conveyed liquid metal at constant inductor voltage and frequency is that the properties of the stream of flowing metal also remain constant during the conveying action. However, in practice it has been found that this condition cannot as a rule be fulfilled because the temperature of the liquid metal is naturally subject to fluctuations. Temperature fluctuations are accompanied by changes in the properties of the material, such as its specific weight, its electrical resistivity and the viscosity of the liquid metal. As a matter of experience the principal factor affecting the rate of flow is the viscosity of the liquid metal. When the temperature falls its viscosity increases. Consequently the depth of the stream of metal flowing through the trough becomes greater and the mass rate at which the metal is conveyed increases accordingly.

It is the object of the present invention to overcome the above difficulties by means of a gate mounted in the trough for limiting the depth of the liquid metal flowing in the conveyor trough. In a first embodiment of this invention the gate comprises an electrically insulating rail mounted in the region of the trough center and preferably parallel to the side walls, so that the distance between the rail and the bottom of the trough will determine the depth of the stream of metal flowing in the trough. In a second embodiment of the invention, the gate is a solid barrier which physically blocks flow above a certain level in the conveyor.

Further, in the second embodiment, the gate is preferably located in the region of the last two poles of the inductor at the upper end of the conveyor. The height of the opening beneath the gate is preferably adjustable and/or the position of the gate along the conveyor can be varied. In order to prevent formation of an oxide skin, means are preferably provided for heating the flowing metal on both sides of the gate. The strength of the travelling field is preferably sufficient to prevent backflow on the downstream side of the gate.

Figure 2:
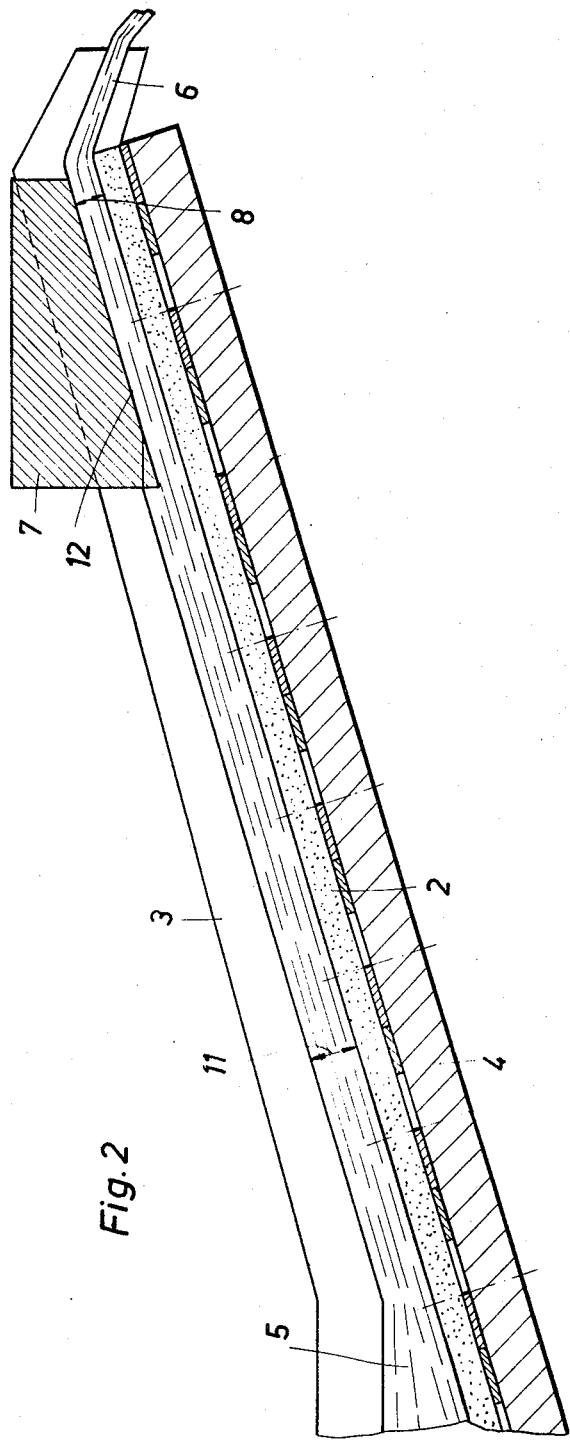
Figure 3:
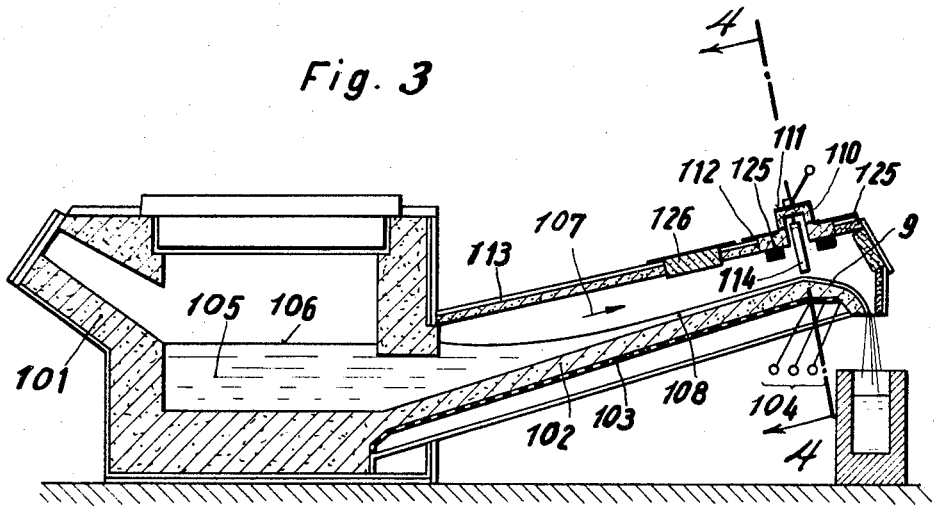
Figure 4:
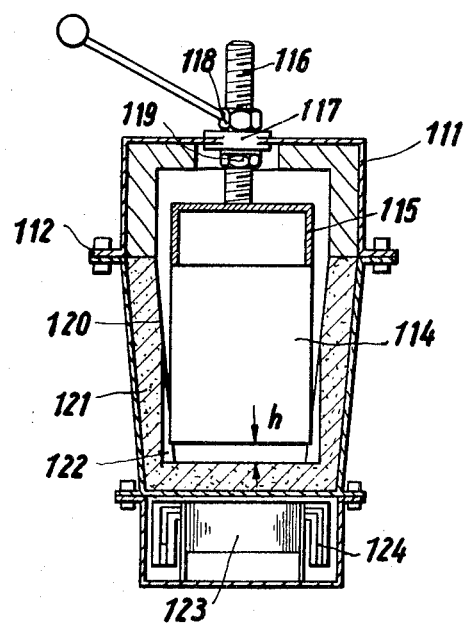

The first embodiment of the invention is hereinafter described and illustrated in the accompanying drawings of which FIG. 1 is a plan view of an electromagnetic conveyor trough and FIG. 2 is a longitudinal section of an electromagnetic conveyor trough. The second embodiment is illustrated in FIGS. 3 and 4 of which FIG. 3 is a schematic representation of a melting furnace and an associated conveyor and FIG. 4 is a section of FIG. 1 taken along the lines 3—3'. Equivalent parts in the Figures are identified by the same reference numerals.

Referring to FIG. 1, the conveyor trough marked 1 consists of a bottom 2 and two side walls 3. Below the conveyor trough 1 is an inductor 4, (shown in FIG. 2) which, when energized with an alternating voltage, generates a travelling field that causes the liquid metal 5 to be propelled up the trough in a stream, of which the depth is indicated at 11, to a pouring spout at 6, discharging it into casting moulds or the like (not shown in the drawing). In order to limit the depth 11 of the stream of liquid metal 5, for example when the temperature fluctuates, an electrically insulating rail 7 is provided, in the region of the trough center and preferably parallel to the side walls 3 of the trough 1, in such manner that the distance between the rail 7 and the bottom 2 of the trough corresponds to the desired depth 8 of the stream of metal that is to be conveyed. The depth 8 of the stream of flowing metal at the end of the insulating rail 7 is maintained because the components of the induction currents flowing in the liquid metal across the trough axis and parallel to the trough bottom 2, which are responsible for propelling the metal 5, are interrupted above the level 8 determined by the position of the insulating rail 7 and therefore complete their circuits within the reduced width of the two lateral portions 9 and 10 of the trough. The propulsive force acting on the liquid metal is thereby so reduced in the two portions 9 and 10 of the trough that no substantially liquid metal 5 above the level of the bottom edge 12 of the insulating rail 7 will be conveyed, and at the end of the insulating rail 7 only the liquid metal in the preadjusted region between the bottom of the rail 7 and the bottom 2 of the trough continues to travel up the trough.

To maintain the depth of the flowing stream of metal 5 at depth 8 by means of the insulating rail 7, it is not necessary for the rail 7 to extend along the entire length of the trough 1. As illustrated in FIGS. 1 and 2, the rail may be considerably shorter than the length of the trough, but preferably the insulating rail 7 is at the delivery end of the trough 1.

In order to permit the depth of the stream of liquid metal at the delivery end to be selectably controlled it is advisable to mount the insulating rail 7 so that it is elevationally adjustable. With the aid of an elevationally adjustable rail 7 it is even possible to lower the insulating rail 7 until it bears directly on the bottom 2 of the trough, in which position it will completely stop the liquid metal 5 from being conveyed. To provide proper adjustment of the insulating rail 7 with reference to the trough center, the rail should also be laterally adjustable.

Referring to FIGS. 3 and 4 which illustrate a further embodiment of the invention, the furnace vessel 101 leads into a conveyor 102 which is inclined upwardly relative to the horizontal. Below the conveyor the inductor for the generation of a travelling field comprises the stator winding 103 of a three-phase linear motor. The stator winding 103 is supplied with current via connections 104 by a preferably controllably adjustable source of three-phase power.

The furnace vessel 101 contains a volume of molten metal 105, the level 106 of the bath of metal covering the lower end of the conveyor 102. The three-phase current flowing through the stator windings 103 generates an electromagnetic field which travels in the direction of the arrow 107, so as to propel an open stream 108 of molten metal up conveyor 102.

Between the point reached by the level 106 of the metal bath when this is at its highest and the highest elevation 109 of the conveyor is a gate 110, best seen in FIG. 4. Gate 110 comprises a box-like frame 111 terminating in a rectangular flange 112 for mounting frame 111 in an aperture cut into a cover 113 enclosing the top of the conveyor. Gate frame 111 is internally lined with a refractory material. The gate itself consists of a refractory brick 114 which is attached to the frame 111 by means of a hanger 115 and a bolt 116 which passes through a hole 117 in the frame 111, and which is secured therein by an adjusting nut 118 and a counternut 119. By suitably setting the counternut and the adjusting nut, the gate brick 114 can be elevationally adjusted and the height of the cross-section of flow underneath the brick selected. In order to prevent the gate brick 114 from becoming wedged between the sloping side walls 120 of the refractory lining 121 of the conveyor 102 the lining 121 is provided with slots 122 for the reception of the sides of the gate brick. FIG. 4 also indicates the disposition of the stator of the three-phase linear motor, showing the laminated iron core 123 and the coil heads 124 of the stator winding.

Moreover the formation of an oxide skin on the metal stream in the neighbourhood of the gate is prevented by the provision on each side of the gate brick 114 of heating windings 125 (FIG. 3) attached to the gate frame 111, for keeping the streaming metal hot.

For changing the position of the gate along the length of the conveyor 102 the cover 113 of the conveyor may be provided with several apertures into any one of which the gate can be fitted, with the others then closed by covers, one of which is shown at 126.

The manner in which the gate in the conveyor functions is as follows. The depth of the stream of flowing metal in the conveyor primarily depends upon the intensity and depth of penetration of the three-phase travelling field to which the molten metal is exposed. However owing to the viscosity of the liquid metal the layer of metal which the field draws from the metal bath also entrains additional volumes of metal which form a metal layer that, starting at the point where the level 106 of the metal bath extends furthest up the conveyor 102, decreases like an elongated wedge.

These metal volumes that are additionally entrained produce irregular variations in depth depending upon the transient level 106 of the molten metal in the furnace vessel 101. If the conveyor is relatively short, for instance as in FIG. 3, a substantial increase in depth of the stream of flowing metal extends to the culminating point 109 of the conveyor. Consequently the volumes of metal that are discharged in each pour will vary because of this undesirable change in depth of the metal stream which varies with the transient level 106 of the molten metal in the furnace vessel 101. The effect of the gate is to skim off the surplus volume of metal that has been additionally entrained by the viscosity of the melt.

The position of the gate along the length of the conveyor and the intensity of that part of the travelling field which is adapted to the particular position of the gate are so chosen that all the metal that passes underneath the gate will be electromagnetically drawn away from the gate, i.e. so that no molten metal can flow back under the gate. For this purpose the gate is preferably located in the region of the last two poles of the stator winding at the upper end of the conveyor. With advantage the gate may in fact be located at the highest elevation of the conveyor in which case no back flow of metal can occur irrespective of the existing field strength. The height of the gate is preferably so adjusted that there is no back-pressure on the upstream side of the gate. This can be verified by the absence of a so-called back-pressure wave of the metal on the entry side of the gate.

Many changes and modifications of the above described embodiments of the invention can of course be made without departing from the scope of this invention. Accordingly, that scope is intended to be limited only by the scope of the appended claims.

What is claimed is:

1. In an electromagnetic conveyor for drawing molten metal from a vessel having an inclined trough along which the metal moves, said trough having its lower end terminating in said vessel, and inductor means for generating a travelling electromagnetic field which draws said metal from said vessel in an open stream up said trough against gravity, the improvement comprising an electrically insulating gate valve disposed in said trough so as to extend downwardly from the top of the trough to define an adjusted depth of flow and located between the point of highest elevation of said trough and the point of said trough at which the surface of said metal has an elevation equal to the maximum elevation of the surface of said metal in said vessel for controlling the depth of molten metal passing said gate valve so that the gate valve bottom extends to the level corresponding to desired flow depth and means for adjusting the position of the gate valve bottom to vary desired flow depth.

2. In a conveyor as in claim 1, the further improvement wherein said gate valve is located in the region of the last two poles of said inductor means at the higher end of said trough.

3. In a conveyor as in claim 1, the further improvement wherein said gate valve includes a gate member disposed in said trough and permitting said metal to flow only underneath it and said adjusting means includes a threaded member attached to said gate member and extending through an aperture in the top of said trough and manually operable means associated with the portion of said threaded member outside said trough for changing the vertical position of said gate member.

4. In a conveyor as in claim 1, the further improvement wherein said gate means can be disposed at any of a plurality of positions.

5. In a conveyor as in claim 1, the further improvement including means mounted on each side of said gate valve for heating the flowing metal.

6. An electromagnetic conveyor trough including an electrically insulating gate valve in the region of the trough center viewed in a transverse cross-section of the trough extending downward from the trough top to define an adjusted flow depth, wherein the distance of the bottom edge of the rail from the bottom of the trough controls the depth of flow of a stream of liquid metal flowing in the said trough in the region of the said rail.

7. An electromagnetic conveyor trough according to claim 6, in which the said gate valve is disposed parallel to the side walls of the trough.

8. An electromagnetic conveyor trough according to claim 6, in which the said gate valve is elevationally adjustable.

9. An electromagnetic conveyor trough according to claim 8, in which the said gate valve is laterally adjustable.

10. A method of controlling the depth and quantity of flow of a stream of liquid metal in an inclined electromagnetic trough flowing from a vessel, which comprises locating an electrically insulating gate valve in said trough so as to extend downwardly from the trough top to define an adjusted depth of flow and between the point of highest elevation of said trough and the point of said trough at which the surface of said metal has an elevation equal to the maximum elevation of the metal surface in said vessel, adjusting the level of the bottom edge of said electrically insulating gate valve disposed so as to extend downwardly from the trough top at or near the center of said conveyor trough viewed in a transverse cross-section of the trough with respect to the bottom of the said trough whereby the depth of flow of the said stream of liquid metal in the region of the said rail is confined to the distance between the bottom of the said rail and the bottom of the said trough.

11. A method of drawing molten metal from a vessel along an inclined trough having its lower end terminating in said vessel with a travelling electromagnetic field which draws said metal from said vessel in an open stream up said trough against gravity, comprising the steps of locating an electrically insulating gate valve in said trough so as to extend downwardly from the trough top to define an adjusted depth of flow and between the point of highest elevation of said trough, adjusting the depth of molten metal passing a point on said trough with an electrically insulating gate valve disposed so as to extend downwardly from the trough top and between the point of highest elevation of said trough and the point of said trough at which the surface of said metal has an elevation equal to the maximum elevation of the surface of said metal in said vessel.

12. A method as in claim 11, including the further step of adjusting said depth.

13. A method as in claim 11, including the further step of heating said molten metal as it passes said point at which said depth is controlled.

14. A method as in claim 11, including the further step of generating said travelling field with a field strength in the region of said point at which said depth is controlled high enough to prevent return flow of metal which has passed said point at which said depth is controlled.

15. In an electromagnetic conveyor for drawing molten metal from a vessel having an inclined trough along which the metal moves, said trough having its lower end terminating in said vessel, and inductor means for generating a travelling electromagnetic field which draws said metal from said vessel in an open stream up said trough against gravity, the improvement comprising an electrically insulating gate valve in said trough extending parallel to the trough sides and downward from the top of the trough to define an adjusted depth of flow and providing space between said trough sides and said rail and disposed between the point of highest elevation of said trough and the point of said trough at which the surface of said metal has an elevation equal to the maximum elevation of the surface of said metal in said vessel for controlling the depth of molten metal passing said gate valve.

* * * * *